(12) United States Patent
Loh et al.

(10) Patent No.: US 8,954,672 B2
(45) Date of Patent: Feb. 10, 2015

(54) SYSTEM AND METHOD FOR CACHE ORGANIZATION IN ROW-BASED MEMORIES

(75) Inventors: Gabriel H. Loh, Bellevue, WA (US); Mark D. Hill, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 111 days.

(21) Appl. No.: 13/417,757

(22) Filed: Mar. 12, 2012

(65) Prior Publication Data

US 2013/0238856 A1 Sep. 12, 2013

(51) Int. Cl.
*G06F 12/08* (2006.01)

(52) U.S. Cl.
USPC ............... 711/118; 711/E12.017; 711/102; 711/106; 711/129; 711/133; 711/137; 711/141

(58) Field of Classification Search
USPC .......... 711/118, 102, 106, 129, 133, 137, 141
See application file for complete search history.

(56) References Cited

U.S. PATENT DOCUMENTS

| | | | | |
|---|---|---|---|---|
| 4,905,141 A | * | 2/1990 | Brenza | 711/129 |
| 5,131,080 A | * | 7/1992 | Fredrickson et al. | 345/557 |
| 5,170,468 A | * | 12/1992 | Shah et al. | 345/537 |
| 5,845,101 A | * | 12/1998 | Johnson et al. | 712/207 |
| 6,026,465 A | * | 2/2000 | Mills et al. | 711/103 |
| 6,154,815 A | * | 11/2000 | Hetherington et al. | 711/140 |
| 6,157,980 A | * | 12/2000 | Arimilli et al. | 711/3 |
| 6,382,846 B1 | * | 5/2002 | Lai et al. | 712/209 |
| 6,938,252 B2 | * | 8/2005 | Baylor et al. | 718/102 |
| 7,886,112 B2 | * | 2/2011 | Ohtsuka | 711/137 |
| 8,433,851 B2 | * | 4/2013 | Clark et al. | 711/128 |
| 2002/0078124 A1 | * | 6/2002 | Baylor et al. | 709/106 |
| 2006/0236036 A1 | * | 10/2006 | Gschwind et al. | 711/137 |
| 2007/0277000 A1 | * | 11/2007 | Ohtsuka | 711/133 |
| 2011/0131381 A1 | * | 6/2011 | Kaplan | 711/141 |
| 2014/0253575 A1 | * | 9/2014 | Yang et al. | 345/569 |

OTHER PUBLICATIONS

Rothman, Jeffrey B. and Smith, Alan Jay; *The Pool of Subsectors Cache Design*; Report No. UCB/CSD-99-1035; Jan. 1999, Computer Science Division (EECS), University of California; 36 pages.

* cited by examiner

*Primary Examiner* — Mardochee Chery
(74) *Attorney, Agent, or Firm* — Faegre Baker Daniels LLP

(57) ABSTRACT

The present disclosure relates to a method and system for mapping cache lines to a row-based cache. In particular, a method includes, in response to a plurality of memory access requests each including an address associated with a cache line of a main memory, mapping sequentially addressed cache lines of the main memory to a row of the row-based cache. A disclosed system includes row index computation logic operative to map sequentially addressed cache lines of a main memory to a row of a row-based cache in response to a plurality of memory access requests each including an address associated with a cache line of the main memory.

20 Claims, 8 Drawing Sheets

SYSTEM AND METHOD FOR CACHE ORGANIZATION IN ROW-BASED MEMORIES

FIELD OF THE DISCLOSURE

The present disclosure is generally related to the field of cache organization, and more particularly to methods and systems for mapping cache lines to a row-based cache.

BACKGROUND

Computing systems include one or more memories for storing data and other information in the form of bits. Many computing systems include both a main or primary memory and a cache memory. The main memory, which may include one or more memory structures or storage mediums, stores data and instructions that are executed by a processor (e.g., CPU) or other control unit of the computing system. Some main memories include volatile random access memories (RAM), although other suitable memory types may be provided. The cache memory, which also may include one or more memory structures or storage mediums, is often used by a processor of the computing system to temporarily store copies of data from the main memory to reduce the time or latency required for the processor to access and manipulate requested data. A memory controller, internal or external to the processor, typically controls the indexing of and access to data stored in the cache and in the main memory.

Based on memory requests from the processor, the memory controller populates the cache with data from the main memory after startup of the computing system and on-demand throughout the operation of the computing system. Data is transferred between the main memory and the cache in the form of cache lines. In particular, a "cache line" (or "cache block") as used herein refers to the unit or block of data from the main memory that is transferred between the main memory and the cache. The cache line is typically fixed in size as set by the processor or memory controller of the computing system. Cache lines may include any suitable size, typically based on the power of two (i.e., cache line size=$2^n$). A common cache line size is 64 bytes. Other suitable cache line sizes may be provided, such as, for example, 16, 32, 64, 128, and 256 bytes. As such, cache lines are used to transfer data from the main memory for temporary storage in the cache. A "data block" as used herein refers to a portion or a data subset of the cache line. For example, a 128-byte cache line may include two 64-byte data blocks.

Row-based memories may be used as the cache for a computing system. A row-based memory includes multiple memory locations organized into rows or "sets," and each row is operative to store multiple cache lines from the main memory. The number of cache lines storable in each row of the cache is the set associativity of the cache. For example, a 2 kilobyte row of a cache with 64-byte cache lines has a 32-way set associativity (2048/64=32).

In particular, row-based memories typically store data in a bit cell array that includes multiple rows of bit cells. Each bit cell is operative to store a data bit in some physical format. For example, a dynamic random access memory (DRAM) stores a charge to encode a bit value (i.e., logical 0 or 1), and resistive memories (e.g., phase-change memory, memristors, etc.) encode the bit value using the resistance of the material in the bit cell. Reading the bit cells typically involves sensing the physical properties (e.g., the presence or absence of charge in DRAM, whether the resistance is high or low in resistive memories, etc.) of an entire row of bit cells in the bit cell array, and then recording or loading all detected values in the row into a row buffer of the memory. To access data in the row-based memory, the memory controller loads a row of the array into the row buffer and then accesses the loaded row buffer such that data in the row buffer can be read from and/or written to. As such, read and write operations performed on the cache are performed at the row buffer. On the other hand, in a memory that is not row-based, such as a static random access memory (SRAM), for example, data is read directly from and written directly to the bit cell array of the memory. As such, data is not required to be first loaded into a row buffer before the read/write operation is performed.

In row-based memories, copying the data from the requested row of the bit cell array into the row buffer is referred to as "activating" or "opening" the row. In some row-based memories, such as DRAM, for example, the data in the row buffer is written back to the bit cell array after the read/write operation or access is complete because the original activation operation often destroys the charges (i.e., data) stored in the activated row. Restoring or writing back the data from the row buffer to a row of the bit cell array is referred to as "precharging" or "closing" the row. Each activation and precharge of the bit cell array consumes energy, increases observed memory access latencies, and reduces memory bank availability. In non-row-based memories, because data is not required to be first loaded into a row buffer before the read/write operation, separate activate and precharge operations are not required for each row access.

FIG. 1 illustrates an exemplary known memory control system 10 including a control unit 12 operatively coupled to a cache memory 14 and to a main memory 18. Control unit 12, such as a processor, includes a memory controller 16 that controls access to memories 14, 18 for read/write operations. Memory controller 16, while illustrated as a single block, includes logic for controlling main memory 18 and logic for controlling cache memory 14. Memory 14 is illustratively a row-based memory 14 serving as a cache memory for control unit 12. Exemplary memories 14 include a dynamic random access memory (DRAM), phase-change memory (PCM), spin-torque transfer magnetoresistive random-access memory (STT-MRAM), or other suitable volatile and non-volatile row-based memories.

Row-based memory 14 includes a bit cell array 20 comprised of a plurality of rows, and each row is comprised of a plurality of bit cells (i.e., storage cells or memory cells) operative to store data, as described herein. Each bit cell of bit cell array 20 represents a "bit" of stored data and has two stable states—an off state (e.g., logical "0") and an on state (e.g., logical "1"). Some row-based memories, such as some flash memories and phase-change memories (PCMs), for example, allow for non-binary encodings and encode multiple bits of information per bit cell. For example, PCMs may use different levels of resistance to encode multiple bits, e.g., logical "00" is very low resistance, logical "01" is medium-low resistance, logical "10" is medium-high resistance, and logical "11" is very high resistance. An activated row of bit cell array 20 is loaded into the row buffer 22 during the read and/or write access, as described above. Memory 14 may further include a buffer cache 24 that provides additional caching, for example, to improve memory speed (such as in a flash memory, for example).

In the illustrated embodiment, memory 14 is in communication with control unit 12 and memory controller 16 via communication paths 26, 28. Communication path 26 includes one or more electrical lines or conductors for communicating various commands and controls from memory controller 16 to memory 14. Such commands include activate and precharge commands (described herein), read command, write command, and other suitable memory commands, such as power mode control, wake up and sleep mode control, etc. Communication path 28 includes a data bus for communicating data during the read and write operations.

Memory controller 16 includes logic that communicates with main memory 18 via one or more communication links 30. Communication link 30 includes a data bus or data paths for communicating read/write data as well as one or more control paths for communicating controls, commands, and feedback between memory controller 16 and memory 18.

To initiate a memory access and thus a read/write operation, control unit 12 provides a memory access request to memory controller 16 that requests a read or write operation. For example, an application, operating system, or other program or logic executed by control unit 12 provides the memory access requests to memory controller 16. Upon receipt of the memory access request, the memory controller 16 accesses the requested location in cache 14 (loads the corresponding row of array 20 into the row buffer 22) and returns the data to control unit 12 for a read operation or modifies the data in the row buffer 22 for a write operation. If the requested data is not stored in cache 14, memory controller 16 retrieves the data from main memory 18 and stores it in the cache 14.

The access latencies depend on whether the cache access requires closing (i.e., precharging) an already opened (i.e., activated) row of the cache before opening the requested row. If a requested row has already been opened by an earlier memory access request, a read or write can be completed in less time than if the activate and precharge commands also need to be issued.

Conventional memory control systems 10 map requested cache lines to the row-based memory 14 such that sequentially (i.e., consecutively) addressed cache lines of the main memory 18 are mapped to consecutive rows in the cache 14. For example, referring to FIG. 2, three consecutive physical rows (i, i+1, i+2) of bit cell array 20 are illustrated. Addresses A0, A1, and A2 represent consecutive main memory addresses of three cache lines that are stored in bit cell array 20. In other words, address A0 is the main memory address of a first cache line, address A1 is the main memory address of a second cache line that is stored adjacent the first cache line in main memory 18, and address A2 is the main memory address of a third cache line that is stored adjacent the second cache line in main memory 18. Consecutively addressed cache lines of main memory 18 having addresses A0, A1, and A2 are stored in consecutive rows (i, i+1, i+2) of bit cell array 20. As illustrated, the cache line with main memory address A0 is stored in row i, the cache line with address A1 is stored in row i+1, and the cache line with address A2 is stored in row i+2. For a cache line size of 64 bytes, for example, the actual bit values of addresses A0, A1, and A2 are separated by 64 bytes. Bit cell array 20 illustratively stores another cache line having main memory address B0. In the illustrated embodiment, main memory address B0 is at a separate location of main memory 18 that is nonconsecutive with addresses A0, A1, A2. While only four cache lines are illustratively stored in bit cell array 20 of FIG. 2, additional cache lines may be stored in array 20.

As such, to populate bit cell array 20 as illustrated in FIG. 2, memory controller 16 (FIG. 1) maps the cache lines to the row-based memory 14 such that sequentially addressed cache lines of the main memory 18 are mapped to consecutive rows in the cache 14. If the last row of the bit cell array 20 is reached during the mapping of consecutively addressed cache lines, the next consecutively addressed cache line of main memory 18 is mapped to the next available memory location of the first row i, thereby providing a "round-robin" mapping sequence. Various replacement strategies or policies may be implemented to manage the replacement of cache entries in an accessed row of bit cell array 20 with other cache lines from the array 20.

With the cache line organization of FIG. 2, long sequences of sequential cache line accesses cause repeated activations and precharges, thereby increasing the total access latencies. For example, timeline 40 of FIG. 2 illustrates the sequence for accessing the sequential cache lines with main memory addresses A0 and A1. First, accessing the cache line with main memory address A0 requires an activation (ACT) of row i followed by the read (or write) of the cache line. To then access the cache line with main memory address A1, a precharge is required to close row i before another activation (ACT) is implemented to open row i+1 where the cache line with address A1 is stored. Further, memory 14 (FIG. 1) often has a built-in electrical delay between the activation and precharge of a row based on the specifications of the memory chip. This built-in delay (e.g., the Row Active Time (tRAS) for RAM, etc.) is often longer than the time required to perform the read on the row buffer, as illustrated with the DELAY of FIG. 2, thereby further increasing the overall access latencies of the row-based memory 14.

Some conventional memory control systems utilize larger cache lines while attempting to capture spatial locality benefits of main memory data. With larger cache lines and thus a larger block of data transferred from main memory 18 to cache 14, it may be possible to execute memory requests for spatially local data, i.e., data in physically nearby memory locations of the main memory 18, with fewer row accesses. For example, referring to FIG. 3, the cache lines of bit cell array 20 are doubled in size compared with the cache lines of FIG. 2. In particular, address A0 of FIG. 3 references a cache line that spans two cache lines of FIG. 2 (spans both data blocks at addresses A0 and A1). With cache line addresses A0 and A1 of FIG. 2 referencing two separate but consecutive cache lines each with a size of 64 bytes, for example, cache line address A0 of FIG. 3 points to a single cache line having a size of 128 bytes. As such, while FIG. 3 illustrates two separate data blocks associated with main memory addresses A0 and A1, the two data blocks cooperate to form a single larger cache line having main memory address A0.

Three additional, nonconsecutive cache lines are illustrated in row i with main memory addresses B0, C0, and D0, with each cache line spanning two 64-byte data blocks (e.g., B0 and B1; C0 and C1; and D0 and D1) for a total size of 128 bytes. As such, the four cache lines at addresses A0, B0, C0, D0 are at nonconsecutive addresses. Similar to the cache organization of FIG. 2, the cache line at address A2, which is the next consecutive cache line address after address A0, is stored in the next consecutive row (row i+1).

With the larger cache line size of FIG. 3, the set associativity of each cache row is reduced. For example, with 64-byte cache lines and 2-kilobyte rows, bit cell array 20 of FIG. 2 has 32-way set associativity. However, with 128-byte cache lines and 2-kilobyte rows, bit cell array 20 of FIG. 3 has only 16-way set associativity. Further, larger cache line sizes may lead to an increase in false sharing for cache coherent systems. For example, in a multi-core processor system, it is possible that two different processor cores (e.g., core X and core Y) each have a copy of a 128-byte cache line spanning main memory addresses A0 and A1 in their respective caches. If core X writes to the data block with address A0, then core Y must discard the entire cache line, including both data blocks at A0 and A1, because the stored data is no longer valid or up-to-date. If core Y is only accessing data at A1 rather than at A0, then invalidation of the entire cache line wastes power and increases latency because core Y only needed to invalidate the data block at address A0, i.e., because the data at A1 was still up-to-date. As such, because the cache only handles data on cache line granularity (illustratively 128 bytes in FIG. 3), then even if a single byte within an entire cache line is modified, all other copies of the cache line in other cores are invalidated. Accordingly, rather than sharing data at A0 and A1, cores X and Y are actually using disjoint data. Further, memory bandwidth consumption is increased, as the data at both A0 and A1 is transferred even if only one of A0 and A1 is used.

Further still, some portions of the cache line in the accessed row may not be needed but still take up memory space, leading to fragmentation in which unused data blocks occupy cache memory. In particular, memory bandwidth may be wasted when, for example, only a single 64-byte block of data is requested during the row access but the cache line is larger, such as 128 bytes or 256 bytes. In FIG. 3, the data blocks with addresses C1 and D1 are illustratively not utilized in a memory access of row i but are still stored in the row due to the large cache line size described above. As such, a request for the data blocks at address E0 or F0 will result in a "cache miss" because these data blocks are not stored in the cache 14. For example, upon a request for address E0, one of the cache lines at addresses A0, B0, C0, or D0 must be evicted from row i based on the replacement policy of memory controller 16, and then the cache line at address E0 is retrieved from main memory 18 and is installed in row i in the newly vacant location. Accordingly, accessing the data block with address E0 or F0 results in increased access latencies and power consumption. Larger cache lines may thus increase "cache miss" rates due to the fragmentation.

Sub-sectoring may be used by the memory controller 18 to reduce the bandwidth consumption and false sharing impacts of larger cache lines. Sub-sectoring reads from or writes to only needed data blocks or "sectors" (i.e., a portion or data subset of the cache line) of the row buffer during the access. For example, rather than reading the entire cache line spanning addresses C0 and C1, sub-sectoring allows only the needed data block at address C0 to be read. However, sub-sectoring does not solve the problem of reduced cache efficiency and underutilization of the cache due to fragmentation, as the unrequested data blocks with addresses C1 and D1 still occupy row space. Further, sub-sectoring does not solve the problem of reduced set associativity of the cache.

Referring to FIG. 4, a "pool of subsectors" approach is utilized in conjunction with the larger cache lines of FIG. 3. FIG. 4 illustrates row i of bit cell array 20 of FIG. 3, which includes cache lines that are double the size of the cache lines of FIG. 2, along with a tag array 62 comprised of multiple tag entries. Each tag or address entry of tag array 62 identifies the location of a single cache line in array 20. In particular, each tag entry includes a main memory address of a cache line and two pointers that identify the location of data blocks of the cache line in bit cell array 20. Each pointer points to a data block or "subsector" located in a different pool of the row. In particular, bit cell array 20 is divided into two pools such that half of each cache line is allocated to the first pool (pool '0') and the other half of the cache line is allocated to the second pool (pool '1'). For example, tag entry A01 stores a main memory address A0 of a cache line, a pointer that identifies the location in pool '0' of the data block of the cache line having address A0, and a pointer that identifies the location in pool '1' of the data block of the cache line having main memory address A1. Tag entry B01 similarly stores a cache line address B0 and two pointers each pointing to the data block or subsector of the cache line in each pool of array 20. Tag entries C01 and D01 each include a single pointer pointing to the respective data block of the corresponding cache line that is stored in pool '0'. Since the data blocks having main memory addresses C1 and D1 are not requested in FIG. 4, as in FIG. 3, tag entries C01 and D01 do not include pointers that identify the data blocks at respective addresses C1 and D1. However, due to the larger cache lines, the memory space allocated for the data blocks with addresses C1 and D1 are still occupied and are unavailable for other data, despite the data at addresses C1 and D1 not being requested. As such, similar to the cache organization of FIG. 3, other cache lines requested during the row access, such as data blocks with addresses E0 and F0, will result in a "cache miss" and an increase in access latencies and power consumption. As a result, the cache organization of FIG. 4 may also increase "cache miss" rates due to fragmentation issues.

Therefore a need exists for methods and systems to reduce the access latencies involved with a row-based memory. Further, a need exists for such methods and systems to avoid fragmentation and bandwidth consumption issues associated with large cache lines and sub-sectoring and to improve set associativity and cache utilization.

SUMMARY OF EMBODIMENTS OF THE DISCLOSURE

In an exemplary embodiment of the present disclosure, a method for mapping cache lines to a row based cache is provided. The method includes, in response to a plurality of memory access requests each including an address associated with a cache line of a main memory, mapping a plurality of sequentially addressed cache lines of the main memory to a row of the row-based cache.

Among other advantages, some embodiments of the method and system of the present disclosure provide a cache organization strategy that reduces the power consumption and improves performance of the cache by reducing the number of activations and precharges required to access the data stored in the cache. By organizing data in the cache such that a number of sequentially addressed cache lines are stored in the same cache row, data from spatially local cache lines is retrieved from the cache more efficiently, for example. Another exemplary advantage is that set associativity is improved while avoiding fragmentation issues. Other advantages will be recognized by those of ordinary skill in the art.

In one example, an exemplary embodiment of the method further comprises writing the sequentially addressed cache lines of the main memory to the row of the row-based cache. In another example, the method further comprises accessing the row of the row-based memory and at least one of reading data from the sequentially addressed cache lines and writing data to the sequentially addressed cache lines. In yet another example, the mapping includes populating a tag array that associates the sequentially addressed cache lines of the main memory with the row of the row-based memory. In still another example, the tag array stores at least one pointer indicating at least one memory location in the row of the row-based cache containing the sequentially addressed cache lines.

In another exemplary embodiment of the present disclosure, a cache control system is provided including memory control logic having row index computation logic operative to map sequentially addressed cache lines of a main memory to a row of a row-based cache in response to a plurality of memory access requests each including an address associated with a cache line of the main memory.

In still another exemplary embodiment of the present disclosure, a computer readable medium is provided including executable instructions for execution by an integrated circuit production system such that when executed cause the integrated circuit production system to produce an integrated circuit. The integrated circuit includes memory control logic having row index computation logic operative to map sequentially addressed cache lines of a main memory to a row of a row-based cache in response to a plurality of memory access requests each including an address associated with a cache line of the main memory. In one example, the executable instructions are in a hardware description language (HDL) or register-transfer level (RTL) format.

BRIEF DESCRIPTION OF THE DRAWINGS

The invention will be more readily understood in view of the following description when accompanied by the below figures and wherein like reference numerals represent like elements.

DETAILED DESCRIPTION

Figure 1:
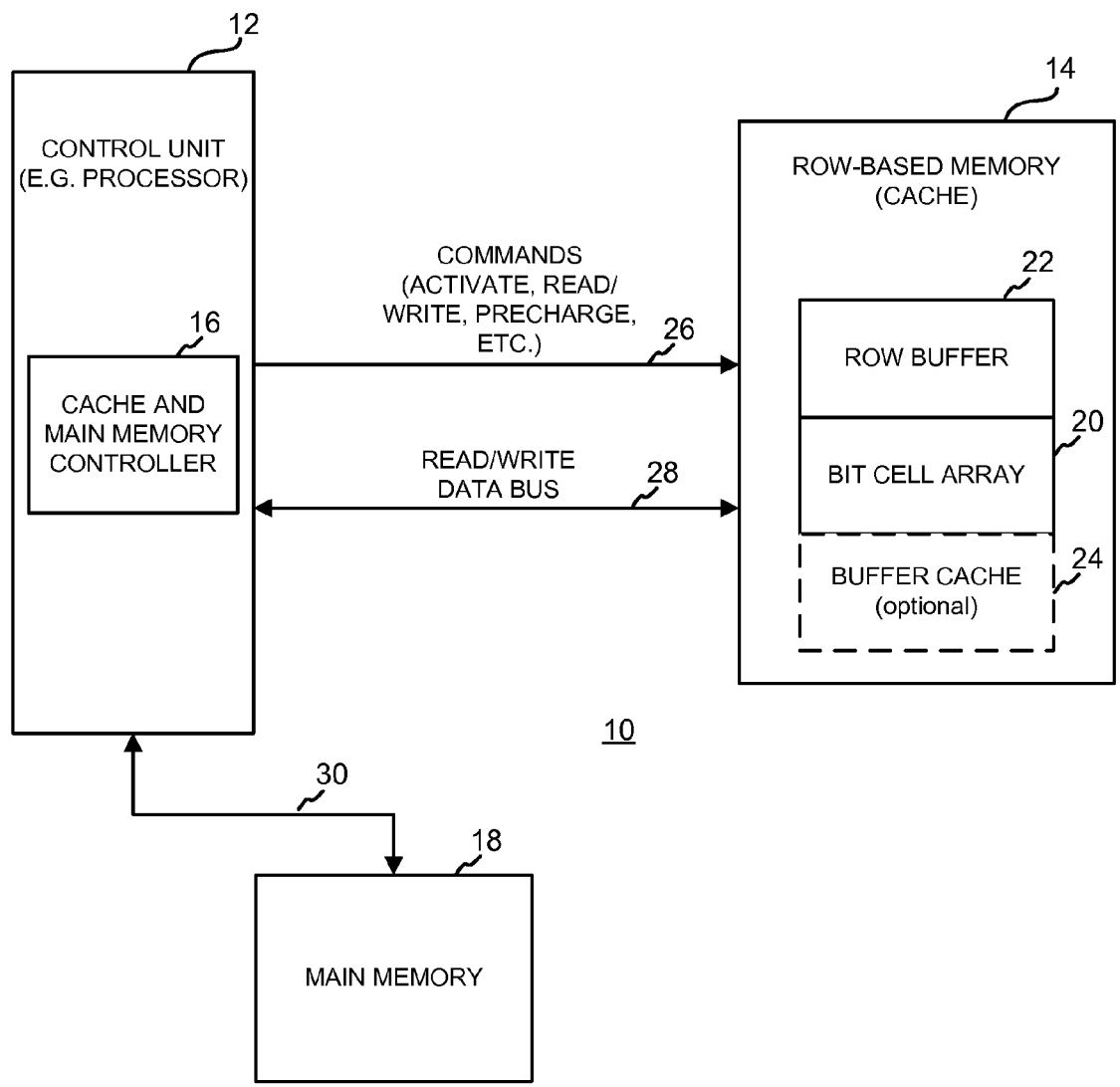
FIG. 1 is a block diagram of an exemplary known memory control system including a memory controller operative to access a row-based memory.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terminology "circuit" and "circuitry" refers generally to hardwired logic that may be implemented using various discrete components such as, but not limited to, diodes, bipolar junction transistors (BJTs), field effect transistors (FETs), etc., which may be implemented on an integrated circuit using any of various technologies as appropriate, such as, but not limited to CMOS, NMOS, etc.

It is to be understood that the terms "high" and "low" (also "on" and "off") are relative to logical values such as respective logical values "1" or "0," which may also be represented as binary "1" or binary "0." The values 1 and 0 are binary values (or logical values) that are normally associated with a logical high (or on) and logical low (or off) as understood by those of ordinary skill.

In addition to the components shown in the figures which for the purpose of explaining the principles of the various embodiments herein disclosed, other elements such as additional logic gates, and/or discrete components, etc., may be present in the various specific implementations as may be understood by those of ordinary skill, and such other implementations still remain in accordance with the embodiments herein disclosed.

The various logic circuitry disclosed herein may be described in a form useable by an integrated circuit fabrication or production system. For example, the various logic circuitry disclosed herein may be described in Hardware Description Language (HDL) and may be stored on a computer readable medium/memory. The computer readable medium/memory may be any suitable non-volatile memory such as, but not limited to, programmable chips such as EEPROMS, flash ROM (thumb drives), compact discs (CDs) digital video disks (DVDs), etc., (that may be used to load HDL and/or RTL (register-transfer level), and/or executable instructions or program code), or any other suitable medium so that the HDL, or other suitable data, may be used by various integrated circuit fabrication systems. Therefore, the embodiments herein disclosed include a computer readable medium/memory comprising executable instructions for execution by an integrated circuit production system, that when executed cause the system to produce an integrated circuit comprising at least one integrated circuit logic cell in accordance with the embodiments herein described. The executable instructions may be HDL and/or RTL or any other suitable code and may include code to produce all of the features of the embodiments described above, and also described in further detail herein below.

Figure 5:
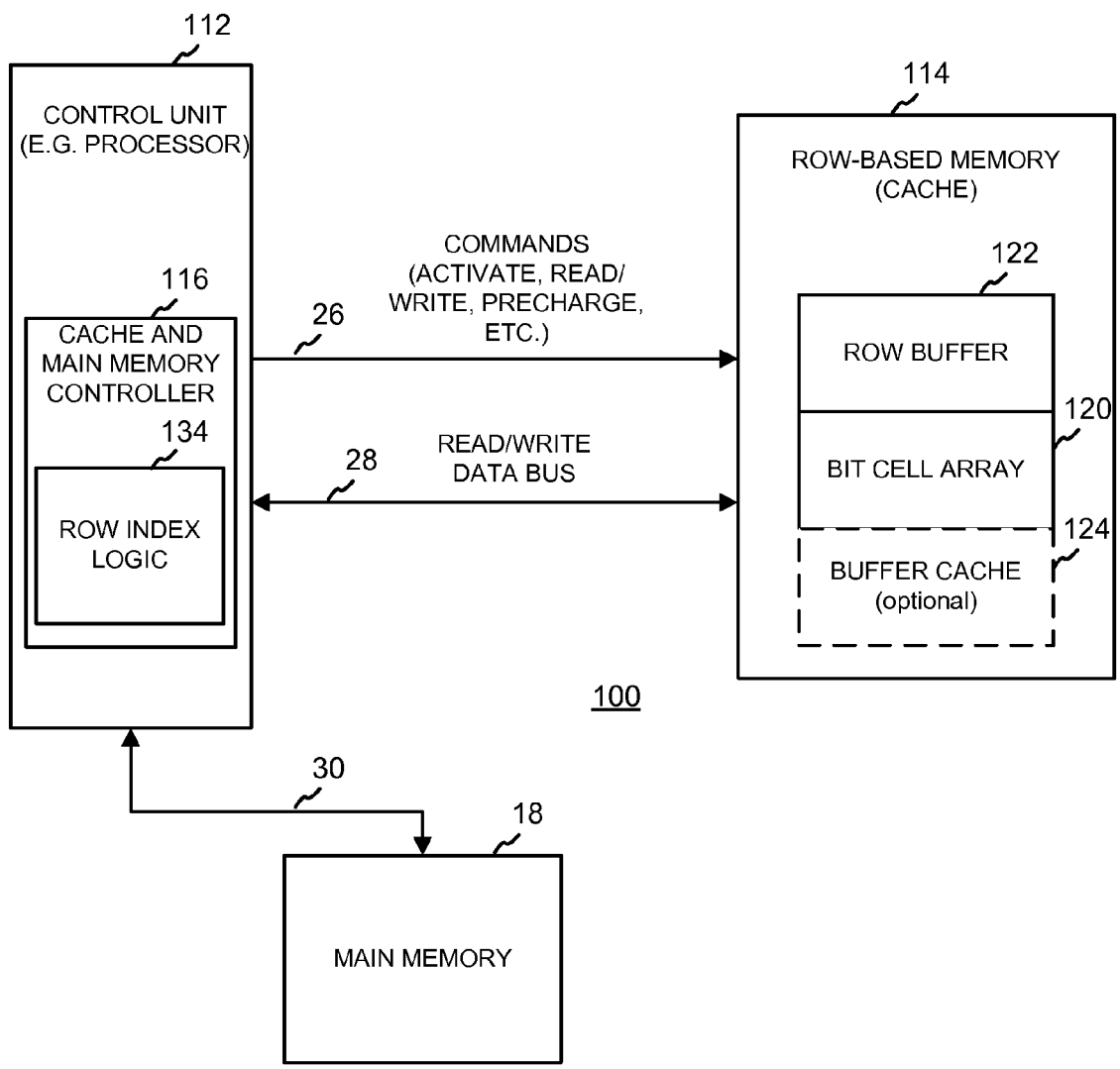
FIG. 5 is a block diagram of a memory control system in accordance with an embodiment including a memory controller with row index logic operative to map cache lines of a main memory to a row-based memory.

Turning now to the drawings, FIG. 5 illustrates an exemplary memory control system 100 according to various embodiments that is configured to reduce the access latencies involved with accessing sequentially addressed cache lines. Memory control system 100 may be viewed as modifying the known memory control system 10 described in FIG. 1. For example, control unit 112 of FIG. 5 may be viewed as a modification of the control unit 12 of FIG. 1, memory controller 116 of FIG. 5 may be viewed as a modification of the memory controller 16 of FIG. 1, and row-based memory 114 of FIG. 5 may be viewed as a modification of the row-based memory 14 of FIG. 1. Like components of memory control system 10 of FIG. 1 and memory control system 100 of FIG. 5 are provided with like reference numbers. Various other arrangements of internal and external components and corresponding connectivity of memory control system 100, that are alternatives to what is illustrated in the figures, may be utilized and such arrangements of internal and external components and corresponding connectivity would remain in accordance with the embodiments herein disclosed.

Referring to FIG. 5, memory control system 100 includes control unit 112 operatively coupled to cache memory 114 and to main memory 18. Control unit 112, such as a processor, includes memory controller 116 having memory control logic operative to control access to and manages memories 18, 114 for read/write operations. In the illustrated embodiment, memory controller 116 is integrated with control unit 112 in a single chip device (e.g. a processor device). However, memory controller 116 alternatively may be external to control unit 112 and in communication with control unit 112 via a communication link. Memory 114 is illustratively a row-based memory 114 serving as a cache memory for control unit 112. Exemplary memories 114 includes a DRAM, PCM, STT-MRAM, or other suitable volatile and non-volatile row-based memories.

Memory 114 includes one or more bit cell arrays 120 each comprised of a plurality of rows, as described herein with respect to memory 14 of FIG. 1. An activated row of bit cell array 120 is loaded into the row buffer 122 during the read and/or write access, as described above with respect to FIG. 1. Memory 114 may further include the optional buffer cache 124.

Row-based memory 114 is physically and logically separate from main memory 18. In the illustrated embodiment, memory 114 is in communication with control unit 112 and memory controller 116 via communication paths 26, 28 for communicating commands and read/write data, respectively, as described above with respect to memory control system 10. In one embodiment, memory 114 is integrated with control unit 112 in a single chip device (e.g. processor device, three-dimensional integrated circuit, etc.). In another embodiment, memory 114 is positioned adjacent or nearby control unit 112, such as with interposer-based integration or with multichip modules (MCMs), for example. Other suitable configurations of memory 114 and control unit 112 may be provided. Memory controller 116 and control unit 112 communicate with main memory 18 via one or more communication links 30, as described herein in FIG. 1.

Control unit 112 includes control logic with software and/or firmware code containing instructions that are executed by the control unit 112. Control unit 112 illustratively includes a processor (e.g. a central processor unit (CPU)), although control unit 112 may include multiple programmable processors, application-specific integrated circuits (ASICs), field-programmable gate arrays (FPGAs), digital signal processors (DSPs), hardwired logic, or combinations thereof. Memory 114 is illustratively a row-based memory 114 serving as a cache memory for control unit 112. Exemplary memories 114 includes a dynamic random access memory (DRAM), phase-change memory (PCM), spin-transfer torque magnetoresistive random-access memory (STT-MRAM), or other suitable volatile and non-volatile row-based memories.

To initiate a memory access and thus a read/write operation, control unit 112 initiates a memory access request to memory controller 116 that requests a read or write operation, and, upon receipt, memory controller 116 accesses the requested location in cache 114 by loading the corresponding bit cell row into the row buffer 122, as described above in FIG. 1.

Figure 2:
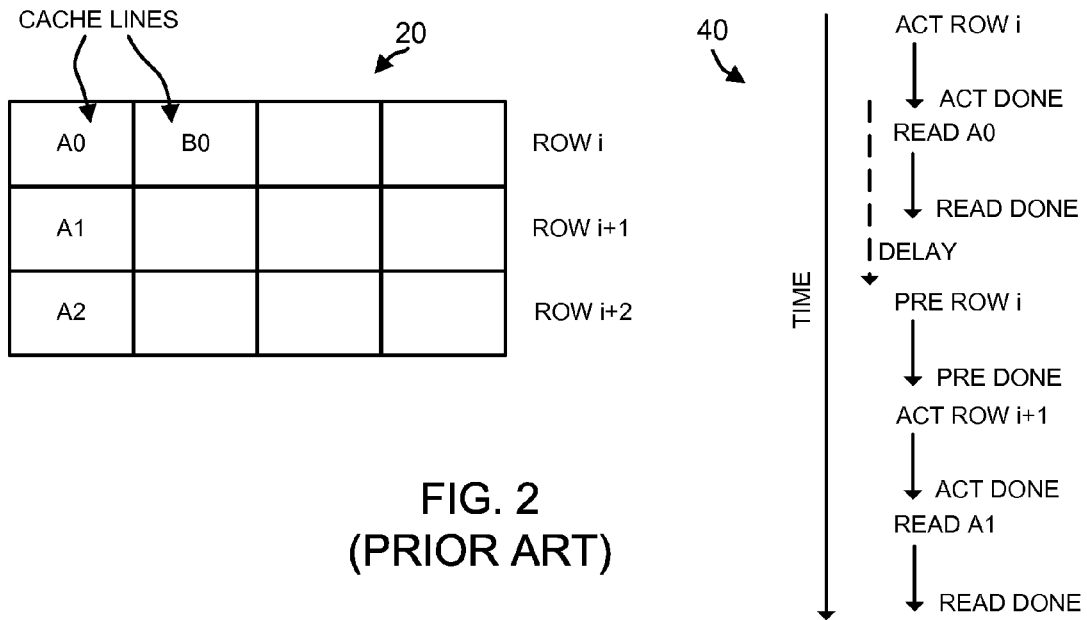
FIG. 2 is a block diagram of an exemplary row-based memory populated by the memory controller of FIG. 1.
Figure 6:
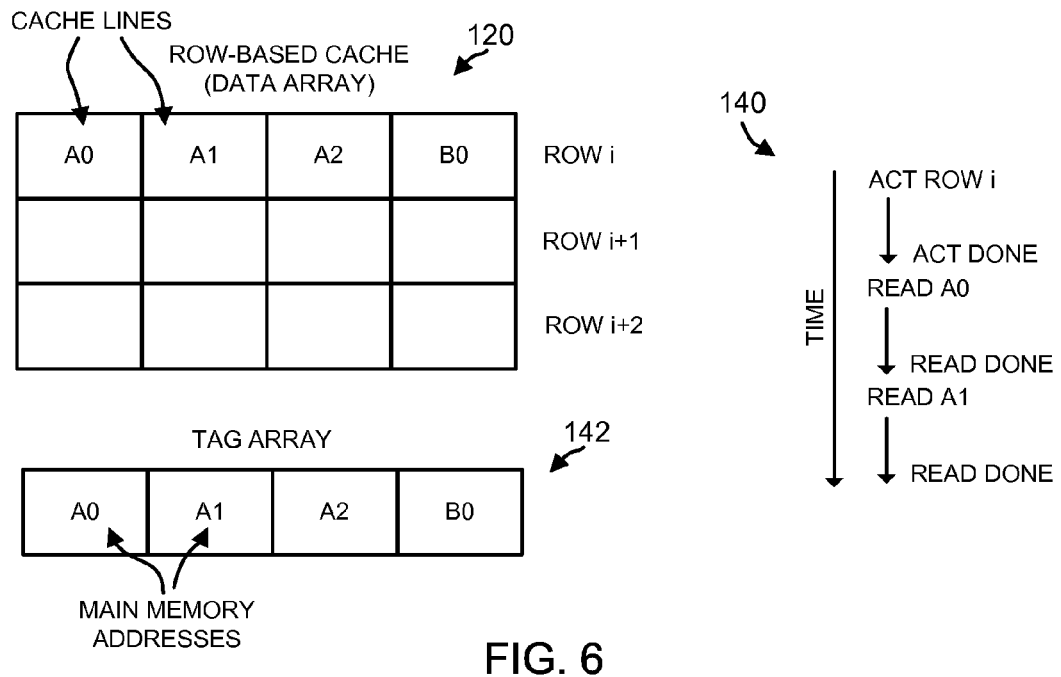
FIG. 6 is a block diagram of an exemplary row-based memory and tag array populated with the row index logic of FIG. 5.

Memory controller 116 includes row computation index logic 134 that is operative to map cache lines of main memory 18 to the bit cell array 120 of cache 114. Based on memory access requests from control unit 112, logic 134 maps requested cache lines to the cache 114 such that a number of sequentially addressed cache lines of the main memory 18 are mapped to the same physical row in the cache 114. For example, referring to FIG. 6, three physical rows (i, i+1, i+2) of bit cell array 120 are illustrated. Similar to FIG. 2, addresses A0, A1, and A2 of FIG. 6 represent consecutive (sequential) main memory addresses of three cache lines that are stored in bit cell array 120. The consecutively addressed cache lines of main memory 18 having addresses A0, A1, and A2 are stored in the same row (row i) of bit cell array 120. Fewer or additional consecutively addressed cache lines may be mapped to row i of the array 120. Bit cell array 120 also illustratively stores the nonconsecutive cache line having main memory address B0 in row i. Additional cache lines may be stored in array 120.

With the cache organization of bit cell array 120 of FIG. 6, memory access requests from control unit 112 (FIG. 5) that request data from the consecutive cache lines with main memory addresses A0, A1, and A2 is carried out with a single row activation. For example, timeline 140 of FIG. 6 illustrates a sequence for accessing the sequential cache lines having main memory addresses A0 and A1. First, accessing the cache line with main memory address A0 requires an activation (ACT) of row i followed by the read (or write) of the cache line. The cache line with address A1 is then read from the row buffer without performing another precharge or activation. Further, a built-in electrical delay (e.g., tRAS of FIG. 2) of memory 114 between activation and precharge is avoided by reading the A1-addressed cache line from the same row as the A0-addressed cache line.

As illustrated in FIG. 6, a tag array 142 is also populated by logic 134 with the population of the bit cell array 120. Tag array 142 provides a "lookup table" for controller 116 by associating the main memory address (or "tag") of each cache line in cache 114 to the location of bit cell array 120 in which the cache line is mapped. Although only a single row of tag array 142 is illustrated in FIG. 6, the number of rows and columns in tag array 142 correspond to the number of rows and columns of bit cell array 120. A main memory address stored in a row and column of tag array 142 will have a corresponding cache line located in the same row and column of the bit cell array 120. As such, upon receiving memory access requests from control unit 112, memory controller 116 looks up the requested cache line address in tag array 142 to determine if the cache line is already stored in cache 114 or if the cache line must be retrieved from main memory 18. In one embodiment, tag array 142 is stored in cache 114 with the cache lines. For example, the tag entries of tag array 142 may be stored by combining the tag entries with the cache lines in the same physical rows or storing the tag entries in a specific layer of the cache 114 (e.g., DRAM stack). In another embodiment, tag array 142 is stored in a separate memory of memory control system 100, such as in a static random access memory (SRAM) or other suitable memory accessible by memory controller 116.

Figure 3:
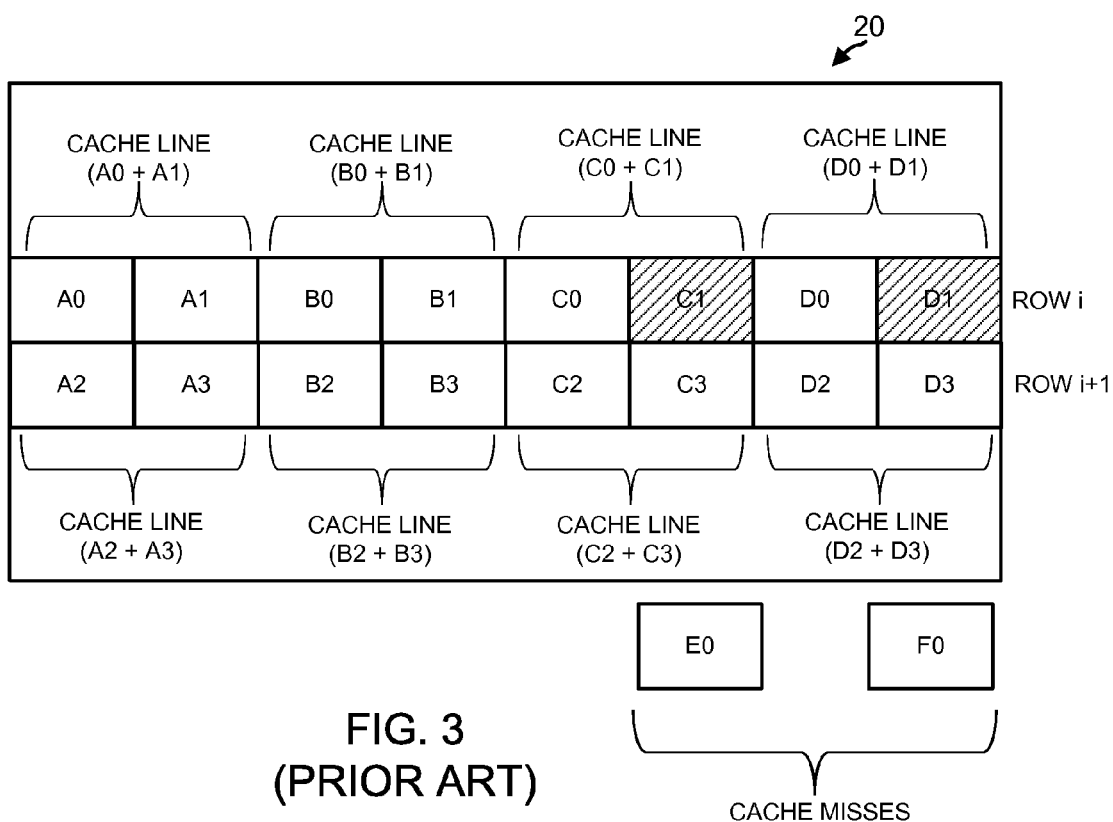
FIG. 3 is a block diagram of another exemplary row-based memory populated by the memory controller of FIG. 1 using large cache lines.
Figure 7:
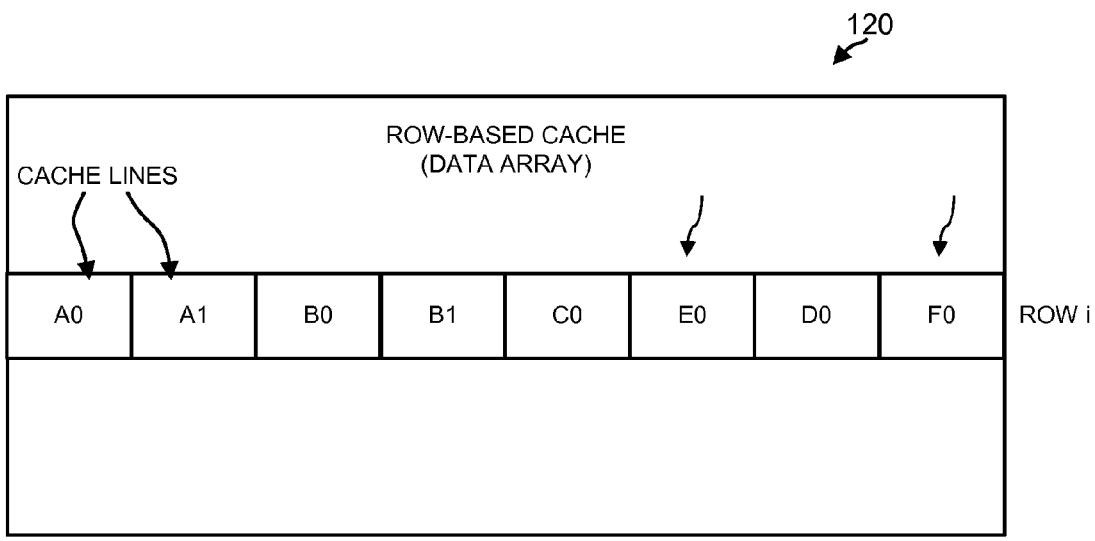
FIG. 7 is a block diagram of another exemplary row-based memory populated with the row index logic of FIG. 5.

Referring to FIG. 7, row index computation logic 134 populates bit cell array 120 of FIG. 3 based on memory access requests from control unit 112 and according to the cache mapping pattern described herein. Rather than setting a larger cache line comprised of multiple data blocks, as in the conventional system of FIG. 3, the cache lines of bit cell array 120 are the same size (e.g., 64 bytes, etc.) as the cache lines of FIG. 6. By mapping the consecutively addressed cache lines to the same row (row i) while utilizing smaller cache lines, additional memory space is available in row i to accommodate the cache lines at addresses E0 and F0, as illustrated in FIG. 7. Rather than storing the unrequested data at addresses C1 and D1 in row i as in the conventional system of FIG. 3, the requested cache lines at addresses E0 and F0 are stored in row i. As such, an access to any of the cache lines at addresses A0, A1, B0, B1, C0, D0, E0, and F0 will result in a cache hit and will not require an access to main memory 18. Further, memory requests for the cache lines at addresses A0, A1, B0, B1, C0, D0, E0, and F0 may illustratively be carried out with a single row access.

Figure 8:
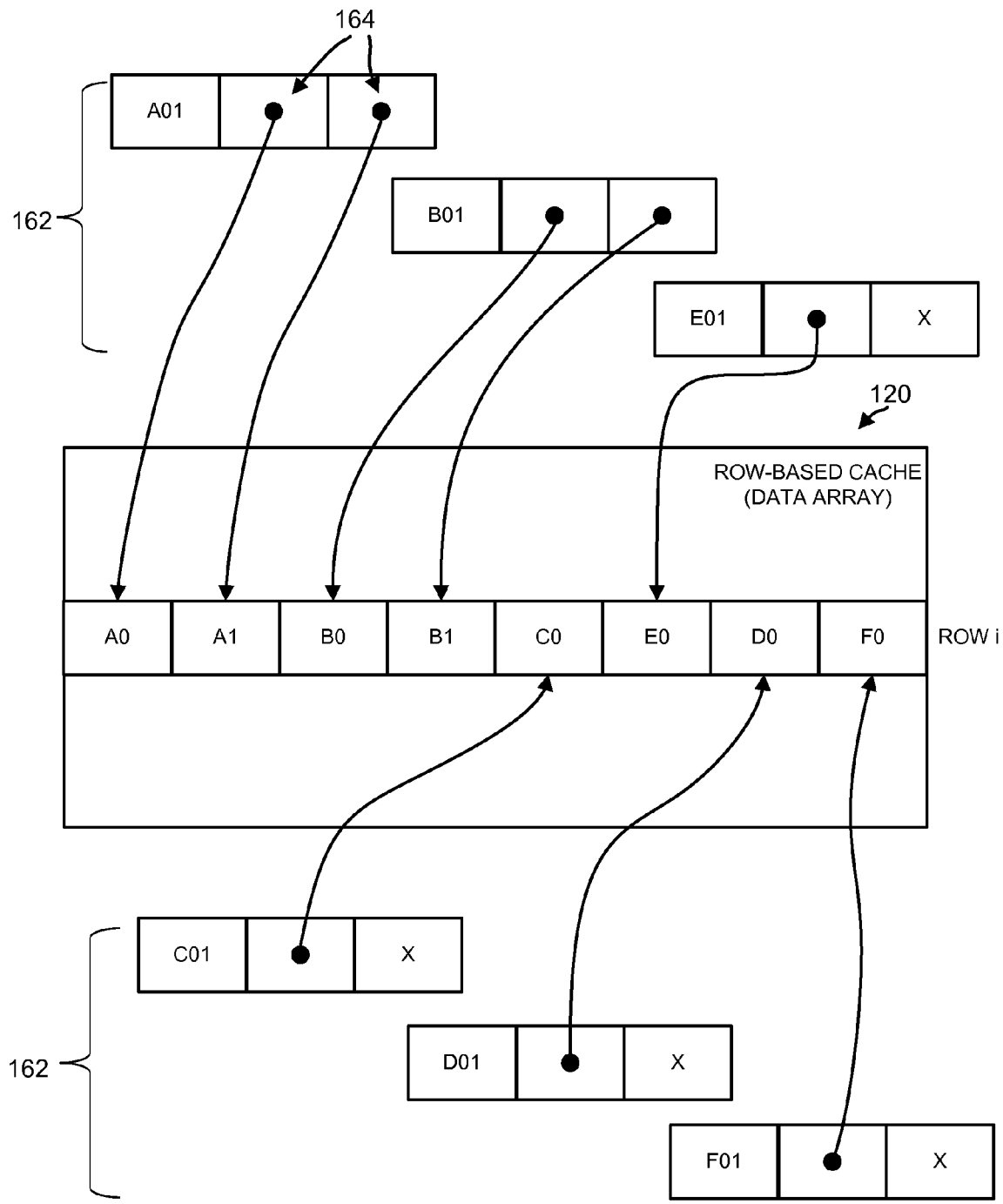
FIG. 8 is a block diagram of the row-based memory of FIG. 7 including a tag array storing pointers to memory locations of the row-based memory.

Referring to FIG. 8, the bit cell array 120 of FIG. 7 is illustrated along with a tag array 162. Tag array 162 utilizes a level of indirection, illustratively with pointers, to identify the physical location of the stored cache lines in cache 114. Each tag or address entry of tag array 162 corresponds to multiple cache lines of array 120. In other words, the number of cache lines stored in cache 114 exceeds the number of cache line addresses stored in tag array 162. For example, tag entry A01 stores the main memory address A0 of a first cache line and one or more pointers that identify or "point" to the row (row i) and location in the row of cache lines that are consecutively addressed with address A0. Tag entry A01 illustratively includes two pointers 164 that identify the locations of the two consecutively addressed cache lines at addresses A0 and A1. Tag entry A01 may include additional pointers that point to additional consecutively addressed cache lines. Tag entry B01 stores address data and pointers in a similar fashion for cache lines that are consecutive with address B0. Tag entries C01, D01, E01, and F01 each illustratively include a single pointer that points to the respective cache line location. In one embodiment, the main memory addresses (e.g., A0, B0, etc.) stored in the tag entries take up more memory space than the pointers. For example, the main memory addresses (e.g., A0, B0, etc.) may be about 30 bits in size while the pointers may be about 3 bits in size. As such, in one embodiment, the use of pointers in tag entries for sequentially addressed cache lines serves to save memory space.

Figure 4:
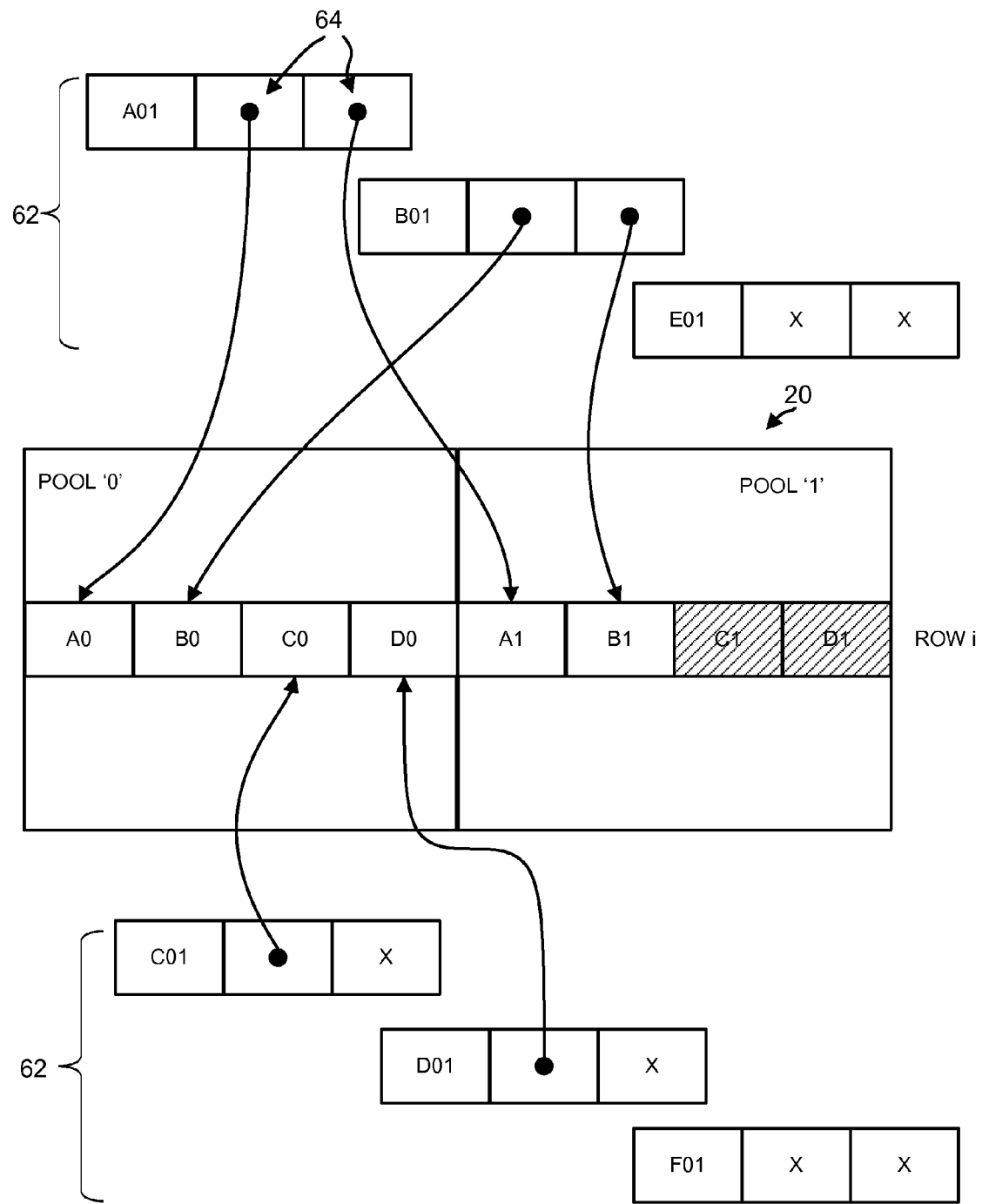
FIG. 4 is a block diagram of another exemplary row-based memory divided into pools and populated by the memory controller of FIG. 1.

As illustrated in FIG. 8 and similar to the cache organization of FIG. 7, by mapping the consecutively addressed cache lines to the same row (row i) while utilizing smaller cache lines, additional memory space is available in row i to accommodate the cache lines at addresses E0 and F0. By not storing the unrequested data at addresses C1 and D1 in row i as in the conventional system of FIG. 4, the requested cache lines at addresses E0 and F0 are able to be stored in row i. As such, tag entries E01 and F01 each include a pointer that identifies the location in row i of the respective cache line at addresses E0 and F0, and an access to any of the cache lines at addresses A0, A1, B0, B1, C0, D0, E0, and F0 will result in a cache hit and will not require an access to main memory 18.

Figure 9:
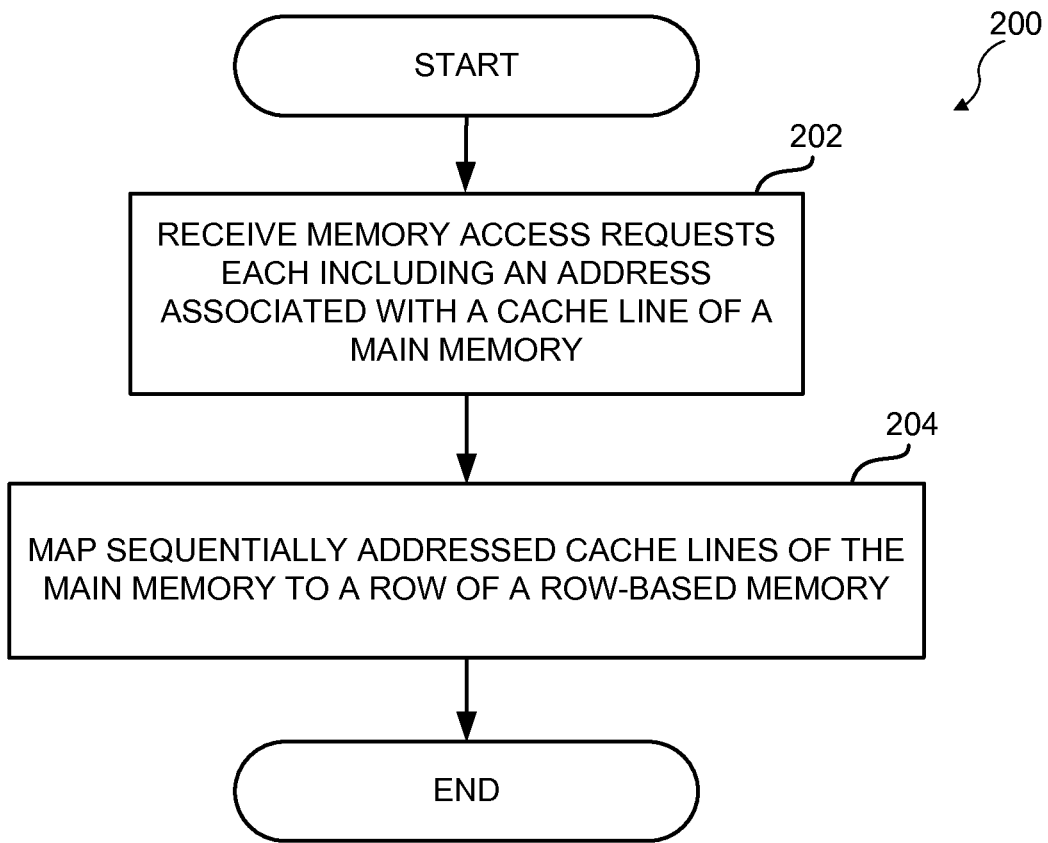
FIG. 9 is a flow chart of an exemplary method of operation of the row index logic of FIG. 5.
Figure 10:
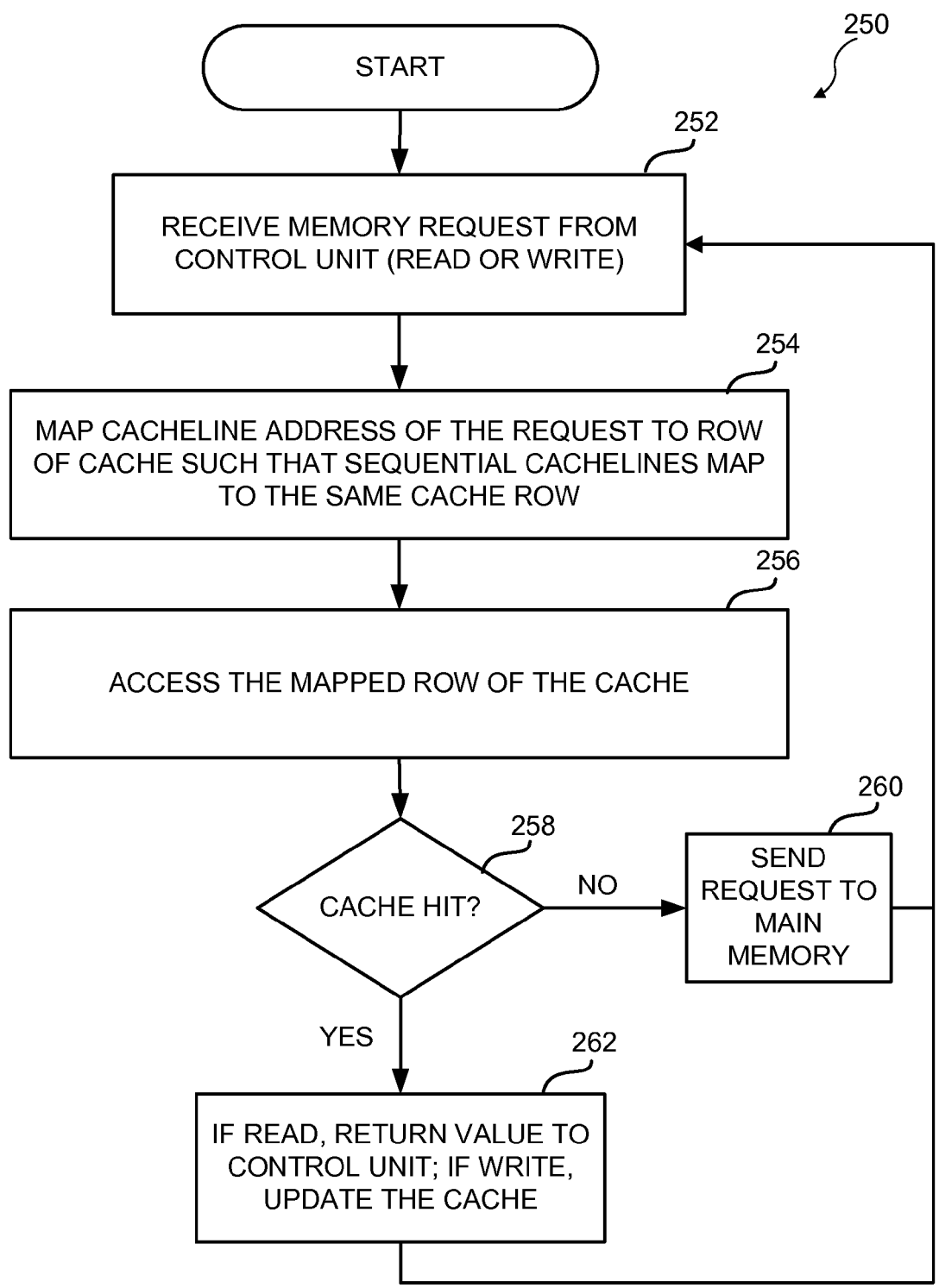
FIG. 10 is a flow chart of an exemplary method of operation of the memory controller of FIG. 5.

FIGS. 9 and 10 illustrate respective flow diagrams 200, 250 of exemplary operations performed by row index computation logic 134 of FIG. 5 for mapping cache lines of a main memory (e.g., main memory 18 of FIG. 5) to a row-based memory (e.g., cache 114 of FIG. 5). Reference is made to FIG. 5 throughout the following descriptions of FIGS. 9 and 10.

Referring to flow diagram 200 of FIG. 9, row index computation logic 134 receives a plurality of memory access requests, such as from a program or application of control unit 112, each request including an address associated with a cache line of main memory 18, as illustrated at block 202. At block 204, logic 134 maps sequentially addressed cache lines of the main memory 18 to a row of the row-based cache 114, as described herein. As a result, two or more sequentially addressed cache lines are stored in the same physical row such that a single row access can access the sequentially addressed cache lines. As described herein, any suitable number of sequentially addressed cache lines may be mapped to a common row.

Referring to the flow diagram 250 of FIG. 10, another exemplary operation of row index computation logic 134 is illustrated. At block 252, logic 134 receives a read or a write memory request from control unit 112. The request includes an identifier, illustratively the main memory address, of a cache line of main memory 18. At block 254, logic 134 maps the requested cache line address to a row of the cache 114 (i.e., bit cell array 120) such that a number of sequential cache lines map to the same cache row, as described herein. In one embodiment, logic 134 populates a tag array (e.g., tag array 142 of FIG. 6) at block 254 with the cache line address and the mapped row location of the cache 114 and populates the cache 114 with data from the requested cache line of main memory 18. At block 256, logic 134 accesses the row of cache 114 that was mapped with the requested cache line address at block 254. If the requested cache line is found in the cache 114 at block 258, logic 134 returns the requested value of the cache line to control unit 112 if a read was requested and updates the identified value of the cache line if a write was requested. If the requested cache line is not found in cache 114 at block 258, logic 134 sends a request to main memory to retrieve the requested cache line.

While the illustrated embodiments described herein in FIGS. 5-10 relate to a cache organization strategy during the population or initialization of the cache 114, any suitable replacement policy may be provided for replacing cache entries after the initial population of the cache 114.

In another embodiment, cache 114 of FIG. 5 is comprised of multiple cache banks, each bank with one or more bit cell arrays 120. In this embodiment, sequentially addressed cache lines of main memory 18 each may be mapped to a different bank of the cache 114 such that accesses to the sequentially addressed cache lines may proceed in parallel.

Among other advantages, the method and system of the present disclosure provides a cache organization strategy that reduces the power consumption and improves performance of the cache by reducing the number of activations and precharges required to access the data stored in the cache. By organizing data in the cache such that sequentially addressed cache lines are stored in the same cache row, data from spatially local cache lines may be retrieved from the cache more efficiently, for example. Another exemplary advantage is that set associativity is improved while avoiding fragmentation issues. Other advantages will be recognized by those of ordinary skill in the art.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

What is claimed is:

1. A method for mapping cache lines to a row-based cache, the method comprising:
   in response to a plurality of memory access requests each including an address associated with a cache line of a main memory, mapping a plurality of sequentially addressed cache lines of the main memory to a same row of the row-based cache.

2. The method of claim 1, further comprising writing the sequentially addressed cache lines of the main memory to the same row of the row-based cache.

3. The method of claim 2, further comprising accessing the same row of the row-based cache and at least one of reading data from the sequentially addressed cache lines and writing data to the sequentially addressed cache lines.

4. The method of claim 1, wherein the mapping includes populating a tag array that associates the sequentially addressed cache lines of the main memory with the same row of the row-based cache.

5. The method of claim 4, wherein the tag array stores at least one pointer indicating at least one memory location in the same row of the row-based cache containing the sequentially addressed cache lines.

6. The method of claim 1, wherein the memory access request includes at least one of a read request operative to read data from the row-based cache and a write request operative to write data to the row-based cache.

7. The method of claim 1, wherein the main memory comprises a plurality of non-transitory storage mediums.

8. The method of claim 1, wherein the plurality of memory access requests are received from at least one processor.

9. A cache control system comprising:
    memory control logic including row index computation logic operative to map a plurality of sequentially addressed cache lines of a main memory to a same row of a row-based cache in response to a plurality of memory access requests each including an address associated with a cache line of the main memory.

10. The system of claim 9, wherein the memory control logic writes the sequentially addressed cache lines of the main memory to the same row of the row-based cache.

11. The system of claim 10, wherein the memory control logic is operative to access the same row of the row-based cache and at least one of read data from the sequentially addressed cache lines and write data to the sequentially addressed cache lines.

12. The system of claim 9, wherein the memory control logic is operative to populate a tag array that associates the sequentially addressed cache lines of the main memory with the same row of the row-based cache.

13. The system of claim 12, wherein the tag array stores at least one pointer indicating at least one memory location in the same row of the row-based cache containing the sequentially addressed cache lines.

14. The system of claim 9, wherein the memory access request includes at least one of a read request operative to read data from the row-based cache and a write request operative to write data to the row-based cache.

15. The system of claim 9, wherein the main memory comprises a plurality of non-transitory storage mediums.

16. The system of claim 9, wherein a processor provides the plurality of memory access requests to the row index computation logic.

17. A non-transitory computer readable medium comprising:
    executable instructions for execution by an integrated circuit production system such that when executed cause the integrated circuit production system to produce an integrated circuit comprising:
    memory control logic including row index computation logic operative to map a plurality of sequentially addressed cache lines of a main memory to a same row of a row-based cache in response to a plurality of memory access requests each including an address associated with a cache line of the main memory.

18. The non-transitory computer readable medium of claim 17, wherein the executable instructions are in a hardware description language (HDL) or register-transfer level (RTL) format.

19. The non-transitory computer readable medium of claim 17, wherein the memory control logic is further operative to write the plurality of sequentially addressed cache lines of the main memory to the same row of the row-based cache.

20. The non-transitory computer readable medium of claim 17, wherein the memory control logic is further operative to populate a tag array that associates the plurality of sequentially addressed cache lines of the main memory with the same row of the row-based cache.

* * * * *